United States Patent Office 3,378,639
Patented Apr. 16, 1968

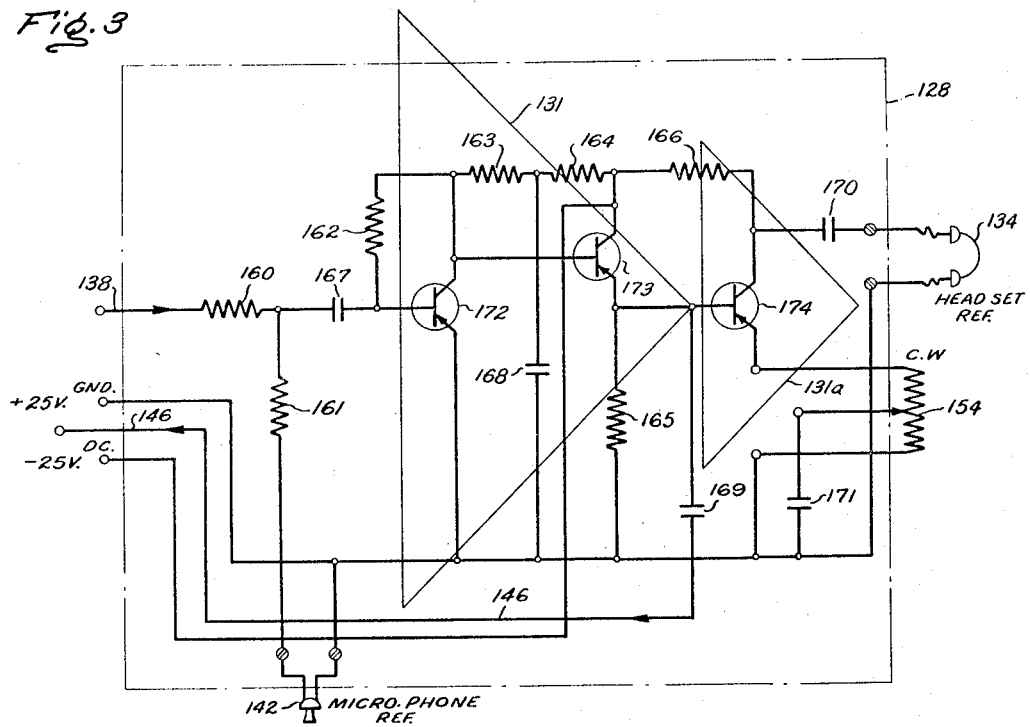
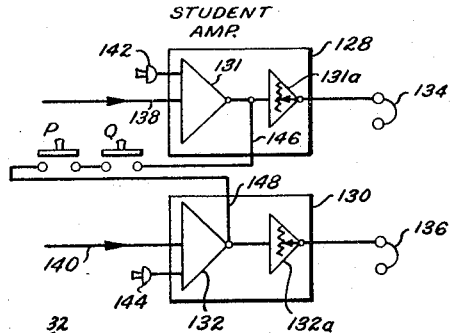
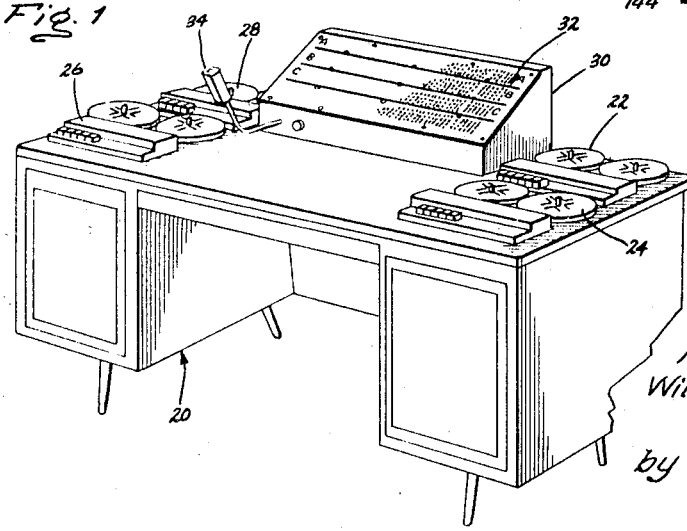

3,378,639
INSTRUCTION APPARATUS FOR CLASSROOMS
William R. Dufendach and Merlin J. Applegate, Grand Rapids, Mich., assignors to American Seating Company, Grand Rapids, Mich.
Original applications Sept. 12, 1960, Ser. No. 60,111, now Patent No. 3,147,555, dated Sept. 8, 1964, and May 5, 1964, Ser. No. 365,029. Divided and this application June 9, 1965, Ser. No. 462,571
4 Claims. (Cl. 179—1)

ABSTRACT OF THE DISCLOSURE

A communication system which includes two amplifiers, each amplifier having first and second stages. Two microphones are connected to the input circuits, respectively, of the first stages and two sound-producing devices are connected to the output circuits, respectively, of the second stages. A volume control is included in the second stage of each amplifier, and a signal circuit connects the output circuits of the two first stages. Each first stage includes an emitter follower as the output circuit thereof, and each second stage includes a transistor having base, emitter and collector elements. The second stage input circuit includes the base element, and the second stage output circuit includes the collector element. The potentiometer is connected in series between the emitter and a ground source of reference potential, the potentiometer having a slider capacitively coupled to the source of reference potential for controlling the gain of the second stage.

---

This is a divisional application Ser. No. 60,111, Sept. 12, 1960, now U.S. Patent No. 3,147,555, granted Sept. 8, 1964, entitled, "Electronic Apparatus for Classroom Instruction," and application Ser. No. 365,029, filed May 5, 1964, entitled "Instruction Apparatus for Classrooms."

The present invention relates to electronic apparatus for classroom instruction and more particularly to apparatus used in the fields of teaching foreign languages, speech therapy, remedial reading, student tutoring, public speaking, voice training, and the like. The invention comprehends the supervision and teaching by a single instructor of a plurality of students simultaneously.

In teaching languages, it is necessary for the student not only to hear the oral presentation but to speak it and then to monitor his spoken responses. Also, the student may speak in a translation of the language lesson and have this monitored by a recording device by the instructor or by another student.

The present invention provides for facile, foolproof communication between two or more students.

In view of the foregoing, it is an object of this invention to provide an electronic system capable of being used in a classroom to give individualized student instruction.

It is another object to provide electronic communication circuitry whereby the level of audio output signals of a plurality of amplifiers interconnected in a communications system may be individually controlled without appreciably affecting the level of audio output signal in any other amplifier.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a perspective illustration of the instructor's console which contains a major portion of the equipment used in the entire system of this invention, this console being operated by the instructor in the control and supervision of the classroom instruction;

FIG. 2 is a block diagram of the student amplifiers of this invention; and

FIG. 3 is a circuit diagram of each of the student amplifiers of FIG. 2.

Referring to the drawings, and more particularly to FIG. 1, the teacher's console, indicated generally by the reference numeral 20, is in the form of a desk and contains almost all of the component circuitry in a complete system for use in teaching foreign languages to a class of, for example, thirty-six students. Mounted on the console top are a plurality of conventional magnetic tape decks, indicated generally by the numerals 22, 24, 26 and 28, respectively, and inside the console are mounted the instructor's amplifier as well as the student amplifiers and associated equipment. Located elsewhere in the classroom (not shown) are the student stations having at the individual locations essentially only a microphone, a volume control and a set of earphones for student use.

While there may be a relatively large number of student stations, for clarity of illustration and description, FIG. 2 illustrates only the presence of two (2) such stations, these being identified respectively by the reference numerals 128 and 130. In these student stations are individual amplifiers, respectively, 131 and 132, the amplifier 131 having connected thereto a final amplifier stage 131a and the amplifier 132 having connected thereto an identical final amplifier stage 132a. As illustrated, earphones 134 and 136 are connected to the output circuits of the two final stages 131a and 132a.

An input circuit 138 is coupled to the amplifier 131 and another input circuit 140 is coupled to the amplifier 132. Coupled in parallel with the input circuit 138 is a microphone 142, another microphone 144 being coupled in parallel with its companion input circuit 140. A line 146, which may be considered as the output circuit of the amplifier 131 and the input circuit of 131a, is connected to a line 148 serving as the output circuit of the amplifier 132 and the input circuit for the amplifier 132a. The two lines 146 and 148 are connected together by manually operable switches P and Q.

The amplifiers used in conjunction with the student stations 128, 130 are identical in a preferred embodiment of this invention, and the circuit diagram for an operating embodiment of this amplifier is illustrated in FIG. 3. The values of the component parts for this amplifier are given at the end hereof.

At this point it should be recognized that both students at stations 128 and 130 are able to adjust their respective receiving volumes without affecting the volume of the signal in the other's earphones. This is accomplished by placing the volume control in the student station in the final amplifier stage 131a which follows connection of the line 146. This volume control in FIG. 3 is indicated by the numeral 154 and is connected between the transistor emitter and reference ground potential.

When it is desired to establish communication between two students, switches P and Q are closed.

Transmission from microphone 142 of station 128 to the earphones 136 of the station 130 passes through the amplifier 131, line 146, line 148, final amplifier stage 132a and then to the earphones 136. Similarly, transmission from the microphone 144 to the earphones 134 occurs through the circuit 132, 148, 146, and amplifier 131a to the earphones 134. The final stages 131a and 132a of the student stations contain the respective volume controls 154 (see FIG. 3) whereby each student may adjust the level of the volume in his earphones without affecting the other student's volume.

In FIG. 3 is a schematic diagram of the circuit of each student station 128 and 130. In the following are listed the values of the component parts for this circuit, it being understood that these values are given only as an exemplification of one embodiment of this invention and not as a limitation thereto.

*Student amplifier—FIG. 3*

Resistor:
- 160 _____ ohms__ 100,000
- 161 _____ do___ 120,000
- 162 _____ Selected
- 163 _____ ohms__ 6,800
- 164 _____ do___ 12,000
- 165 _____ do___ 1,800
- 166 _____ do___ 10,000

Potentiometer 154 _____ do___ 1,500

Capacitor:
- 167 _____ microfarads__ 50
- 168 _____ do___ 50
- 169 _____ do___ 50
- 170 _____ do___ 2
- 171 _____ do___ 50

Transistors 172, 173, 174 _____ 2N1370

Since the amplifier 130 is a duplicate of amplifier 128, it will be necessary to describe only the latter. In this connection, reference is made to FIG. 3. The amplifier 128 includes first and second stages 131 and 131a respectively. The amplifier 131 has two input circuits, one being indicated by the numeral 138 and the other being the circuitry to which the microphone 142 is connected. The second stage 131a has an input circuit indicated by the numeral 146. The output circuit of stage 131 is a line connected between the emitter of transistor 173 and the base of transistor 174. The output circuit of the stage 131a is that to which the headphones 131 is connected, this output circuit including the collector element of the transistor 174 and the capacitor 170. The common ground is indicated by that line having a terminal denoted by the letters GND. A potentiometer 154 is connected between the emitter of the transistor 174 and the ground line. The slider of the potentiometer 154 is connected to the ground line by means of a capacitor 171.

In coupling the two amplifiers 128 and 130 together, the line 146 of amplifier 128 is connected to line 148 of amplifier 130 by means of the two manually operated switches P and Q. The line 146 is common to the input and output circuits of the first and second stages 131 and 131a, respectively, and the line 146 is common to the first and second stages 132 and 132a, respectively, of the amplifier 130. As explained earlier, transmission from microphone 142 of station 128 to the earphones 136 is accomplished by means of the circuitry which includes amplifier 131, line 146, line 148, and stage 132a. Transmission from the microphone 144 to the earphones 134 is accomplished by means of the circuitry 132, 148, 146, and amplifier 131a. The volume of the signal reproduced by the respective earphones 134 and 136 is controlled by adjustment of the respective potentiometer 154 as explained earlier.

While we have described above the principles of our invention in connection with specific apparatus, it is to be clearly understood that this description is made only by way of example and not as a limitation to the scope of the invention.

What is claimed is:

1. In combination, at least two audio amplifiers, each amplifier including first and second stages connected in cascade, each stage having an input and an output circuit, the output circuit of the first stage being connected to the input circuit of the second stage, two microphones connected to the input circuits, respectively, of said first stages, there being one microphone for one first stage, volume control means included in each second stage whereby the level of audio volume delivered by each second stage may be controlled independently of the other second stage, two head sets connected to the output circuits, respectively, of said second stages, there being one headset for one second stage, a circuit conductively connecting the output circuits of the two first stages together, and a switch provided in said connecting circuit for controlling the exchange of signals between said two amplifiers.

2. In a communication system, two amplifiers, each amplifier including first and second stages, each stage having input and output circuits, the output circuit of the first stage being coupled to the input circuit of the second stage, two microphones connected to the input circuits, respectively, of said first stages, there being one microphone for one first stage, the impedances of the first stage output circuits and the second stage input circuits being substantially the same, a volume control in the second stage of each amplifier, two sound-producing devices connected to the output circuits, respectively, of the second stages, there being one device for one second stage, a signal circuit connecting the output circuits of the two first stages together, and a switch in said signal circuit for controlling the exchange of audio signals between said amplifiers.

3. In a communication system, two amplifiers, each amplifier including first and second stages, each stage having input and output circuits, the output circuit of the first stage being coupled to the input circuit of the second stage, two microphones connected to the input circuits, respectively, of said first stages, there being one microphone for one first stage, two sound-producing devices connected to the output circuits, respectively, of the second stages, there being one device for one second stage, a volume control in the second stage of each amplifier, a signal circuit connecting the output circuits of the two first stages together, a switch in said signal circuit for controlling the exchange of audio signals between said amplifiers, each said first stage including an emitter follower as the output circuit thereof, and each said second stage including a transistor having base, emitter and collector elements, the second stage input circuit including said base element, the second stage output circuit including said collector element, and a potentiometer connected in series between said emitter and a ground source of reference potential, and capacitive means for shunt connecting selected portions of said potentiometer to said ground source.

4. The circuit of claim 3 in which said capacitive means includes a slider on said potentiometer which is capacitively coupled to said source of reference potential for controlling the gain of said second stage.

References Cited

UNITED STATES PATENTS

| | | | |
|---|---|---|---|
| 2,979,667 | 4/1961 | Pascal | 330—19 |
| 3,064,083 | 11/1962 | Blank | 330—124 X |
| 3,184,549 | 5/1965 | Auernheimer | 179—1.4 |

OTHER REFERENCES

RCA, Language Laboratory Systems, Installation Manual, June 1959, pages 1–27.

ROY LAKE, *Primary Examiner.*

E. C. FOLSOM, *Assistant Examiner.*